United States Patent
Krzeminski et al.

(10) Patent No.: US 10,323,352 B2
(45) Date of Patent: Jun. 18, 2019

(54) AQUEOUS IMPREGNATION BATH FOR REINFORCEMENT FIBRES AND USES THEREOF

(71) Applicant: ArianeGroup SAS, Paris (FR)

(72) Inventors: Mickaël Krzeminski, Cubzac-les-Ponts (FR); Brigitte Defoort, Saint-Médard-en-Jalles (FR); Maeliss Frisari, Seyssinet-Pariset (FR); Amandine Flourez, Périgueux (FR)

(73) Assignee: ARIANEGROUP SAS, Paris (FR)

( * ) Notice: Subject to any disclaimer, the term of this patent is extended or adjusted under 35 U.S.C. 154(b) by 88 days.

(21) Appl. No.: 15/561,817

(22) PCT Filed: Mar. 29, 2016

(86) PCT No.: PCT/EP2016/056814
§ 371 (c)(1),
(2) Date: Sep. 26, 2017

(87) PCT Pub. No.: WO2016/156325
PCT Pub. Date: Oct. 6, 2016

(65) Prior Publication Data
US 2018/0119333 A1    May 3, 2018

(30) Foreign Application Priority Data
Mar. 31, 2015 (FR) ...................... 15 52741

(51) Int. Cl.
*D06M 13/17* (2006.01)
*C09D 171/00* (2006.01)
(Continued)

(52) U.S. Cl.
CPC ............... *D06M 13/17* (2013.01); *C08J 5/24* (2013.01); *C08L 71/02* (2013.01); *C09D 171/00* (2013.01);
(Continued)

(58) Field of Classification Search
CPC .... D06M 13/17; D06M 15/53; C09D 171/00; C09D 171/02; C08L 71/02; C08J 5/24
See application file for complete search history.

(56) References Cited

U.S. PATENT DOCUMENTS 5,888,580 A    3/1999    Hinrichsen

FOREIGN PATENT DOCUMENTS

| JP | 2014-159650 A | 9/2014 |
| WO | 93/01045 A1 | 1/1993 |
| WO | 2010/136720 A1 | 12/2010 |

OTHER PUBLICATIONS

Search Report issued in French Patent Application No. 1552741 dated Feb. 2, 2016.
(Continued)

*Primary Examiner* — John E Uselding
(74) *Attorney, Agent, or Firm* — Pearne & Gordon LLP

(57) ABSTRACT

The invention relates to an aqueous impregnation bath for reinforcement fibers for manufacturing prepregs having a thermoplastic matrix, resulting in highly satisfactory consolidation, in terms of residual porosity, of the composite material parts manufactured using the prepregs. The impregnation bath includes a least one thermoplastic polymer, a surfactant and water, and is characterized in that the surfactant is an ethoxylated stearyl alcohol of formula: HO—$(CH_2$—$CH_2$—$O)_n$—$CH_2$—$(CH_2)_{16}$—$CH_3$ wherein n is 100. The invention also relates to a method for impregnating reinforcement fibers using the impregnation bath, to a method for manufacturing a prepreg having a thermoplastic matrix using the impregnation method, and to a method for manufacturing a part made of a composite material having a thermoplastic matrix using the method for manufacturing a prepreg. The invention is useful in any field for manufacturing parts made of composite materials and, specifically, in (Continued)

the aeronautical, space, rail, shipping and automotive industries.

13 Claims, 1 Drawing Sheet

(51) Int. Cl.
    *C09D 171/02*     (2006.01)
    *C08L 71/02*     (2006.01)
    *D06M 15/53*     (2006.01)
    *C08J 5/24*     (2006.01)

(52) U.S. Cl.
    CPC ........... *C09D 171/02* (2013.01); *D06M 15/53* (2013.01); *C08J 2300/22* (2013.01)

(56) References Cited

OTHER PUBLICATIONS

International Search Report issued in Patent Application No. PCT/EP2016/056814 dated Jun. 8, 2016.
Written Opinion issued in Patent Application No. PCT/EP2016/056814 dated Jun. 8, 2016.

AQUEOUS IMPREGNATION BATH FOR REINFORCEMENT FIBRES AND USES THEREOF

TECHNICAL FIELD

The invention relates to the field of the manufacture of prepregs having a thermoplastic matrix.

More specifically, it relates to an aqueous impregnation bath for reinforcement fibres which allows manufacturing prepregs having a thermoplastic matrix, resulting in highly satisfactory consolidation, in terms of residual porosity, of the composite material parts manufactured using said prepregs.

It also relates to a method for impregnating reinforcement fibres using said impregnation bath and to a method for manufacturing a prepreg having a thermoplastic matrix using said impregnation method.

It further relates to a method for manufacturing a part made of a composite material having a thermoplastic matrix using the method for manufacturing a prepreg.

The invention finds uses firstly in the aeronautical and space industries, notably for the manufacture of structural parts of large dimensions.

However, it may also find uses in other fields in which composite material parts are manufactured such as the rail, shipping and automotive industries, the armaments industry, for example for the manufacture of missiles or missile-launch tubes, or instead in the field of sports and leisure, for example for the manufacture of articles intended for nautical sports and sliding sports.

PRIOR ART

Composite material parts having a thermoplastic matrix reinforced by unidirectional fibres—known as "strengthening fibres" or "reinforcement fibres"—(made of glass, carbon, aramid, boron, etc.) are manufactured using semi-finished products called "pre-impregnates" or "prepregs".

The manufacture of a prepreg, which consists in coating the reinforcement fibres by the thermoplastic matrix, may be carried out by different methods, depending on the manner in which the material of the matrix is used; for example, the following methods are known:

the method by melting of the thermoplastic polymer intended to form the matrix (or "hot melt" method), consisting in manipulating said polymer in the molten state;

the method by solvent route, which consists in dissolving the thermoplastic polymer intended to form the matrix in a suitable solvent, typically organic and the choice of which generally depends on the chemical nature of the polymer; the solvent has to be removed during the impregnation process; and the method by dispersion, where the thermoplastic polymer intended to form the thermoplastic matrix is dispersed in the form of a powder in a solvent; once again, the solvent has to be removed during the impregnation process.

In a more precise manner, the method by dispersion consists in:

circulating the reinforcement fibres in an impregnation bath comprising the thermoplastic polymer dispersed in the solvent; then once the fibres thereby impregnated have been taken out of the impregnation bath, removing the solvent by drying the fibres;

heating the fibres thereby impregnated and dried to a temperature above the melting temperature of the polymer to favour the adherence of said polymer on the fibres and to confer cohesion to the material; and calendering the fibres thereby coated with polymer to give to the prepreg the desired shape and dimensions.

An example of implementation of this method is described in the U.S. Pat. No. 5,888,580, hereafter reference [1].

For environmental reasons, but also for health and safety reasons, the solvent, which is used for the impregnation bath, is preferably water. Given the hydrophobic nature of most thermoplastic polymers, it is necessary to add to the impregnation bath surface active agents (or surfactants), generally in low quantity, the role of which is to stabilise the dispersion of the thermoplastic polymer in aqueous phase.

It is well known that surfactants are molecules that modify the surface tension between two surfaces. These molecules, generally organic, have an amphiphilic character, that is to say that they comprise two parts of different polarity: an apolar part (that is to say lipophilic) and a polar part (that is to say hydrophilic). The notion of hydrophilic/lipophilic balance (HLB) is used to characterise the more or less hydrophilic character of a surfactant.

In practice, surfactants are thus capable of providing the link between polar and apolar materials and are used—often a small quantity is sufficient—to stabilise dispersions, emulsions, etc.

A reference surfactant in the field of the impregnation of reinforcement fibres in aqueous bath—and which is moreover that which is used in the aforesaid reference [1]—is cetearyl alcohol 25 times ethoxylated, of formula HO—$(CH_2—CH_2—O)_{25}$—$CH_2$—$(CH_2)_m$—$CH_3$ (with m=15-17), which is sold by the BASF Company under the commercial reference Cremophor™ A 25.

The surfactant that is used to stabilise an aqueous impregnation bath for reinforcement fibres is going to be deposited on the fibres during the impregnation process and is thus next going to undergo the treatments that the fibres undergo: drying, heating to the melting temperature of the matrix, calendering. It can therefore be expected that said surfactant is also present, potentially in degraded form, in the prepreg and in the composite material parts produced from said prepreg.

The manufacture of composite material parts using prepregs having a thermoplastic matrix may be carried out by different methods.

However, generally speaking, said manufacture comprises a step of preparing a preform, for example by fibre placement or by draping, followed by a step of so-called "consolidation", sometimes of shaping, which consists in heating the preform under pressure so as to obtain, by creep of the molten polymer matrix, a composite material having a residual porosity that is as low as possible. It is this consolidation step which makes it possible to obtain materials having the quality required in aeronautical and space construction, that is to say materials having the highest possible mechanical properties.

The consolidation may be carried out under a press for small parts, that is to say of maximum surface area of the order of a m².

For larger parts, consolidation is conducted in an autoclave, that is to say an enclosure capable of simultaneously heating and pressuring the parts to consolidate. The pressure used is generally greater than 7 bars and typically equal to 10 bars, the temperature being dependent, for its part, on the nature of the thermoplastic polymer, but it has to be, whatever the case, above its melting temperature. Usually, before being consolidated in the autoclave, the parts undergo an operation of being placed in a bladder, that is to say that they are covered with a leak-tight film; the material may thus be placed under vacuum, under the bladder, during consolidation in the autoclave.

Consolidation in an autoclave is a costly operation, and all the more so when the parts to be consolidated are large, in particular because the construction and the use of autoclaves of large dimensions are costly. Indeed, large sized autoclaves must have a thick and heavy envelope in order to withstand the high pressure and temperature conditions and their use for consolidating parts necessitates the use of large quantities of gas.

It would thus be desirable, notably for cost reasons but also for reliability reasons, to be able to carry out consolidations of parts that lead to composite materials having the required quality in aeronautical and space construction, and to do so without using an autoclave or, if an autoclave is used, under the lowest possible pressure conditions.

Yet, experience shows that composite material parts, which are manufactured using prepregs having a thermoplastic matrix having been produced by impregnation of reinforcement fibres in an aqueous bath of the type described previously generally have, when they are consolidated at pressures notably lower than those conventionally used in an autoclave, degraded mechanical properties, associated with a high porosity level. They are hence considered as defective and cannot be used for aeronautical or space applications.

The Inventors thus set themselves the aim of solving this problem.

Yet, within the scope of their works, the Inventors have observed that by judiciously selecting the surfactant serving to consolidate the thermoplastic polymers when they are dispersed in aqueous impregnation baths for reinforcement fibres, it is possible to obtain prepregs that lead to highly satisfactory consolidation, in terms of residual porosity, of the composite material parts manufactured using said prepregs, and this is so after a step of consolidation without pressurisation in an autoclave and which resorts to an external pressure of at the most 5 bars.

And it is on this observation that the present invention is based.

DESCRIPTION OF THE INVENTION

The invention thus firstly relates to an impregnation bath for reinforcement fibres, which comprises at least one thermoplastic polymer, a surfactant and water, and which is characterised in that the surfactant is a stearyl alcohol 100 times ethoxylated, that is to say an ethoxylated stearyl alcohol which has the formula: $HO-(CH_2-CH_2-O)_n-CH_2-(CH_2)_{16}-CH_3$ wherein n is 100.

This ethoxylated stearyl alcohol, also called polyoxyethylene (100) stearyl ether, is notably available from the CRODA and SIGMA-ADRICH companies under the commercial reference Brij™ S100.

In accordance with the invention, the surfactant is, preferably, present in the impregnation bath in a proportion by weight ranging from 0.25% to 5% and, better still, from 0.50% to 1.5% with respect to the thermoplastic polymer, the latter being, for its part, typically present in said bath in a proportion by weight ranging from 10% to 50% and, better still, from 25% to 35% with respect to water, as a function of the stability of the dispersion, the rate of production of the prepreg and the weight content of fibres.

The thermoplastic polymer may be selected from all thermoplastic polymers capable of being used for the manufacture of composite material parts. Thus, it may notably be a polyaryletherketone (or PAEK) such as a polyetherketone (or PEK), a polyetheretherketone (or PEEK) or a polyetherketoneketone (or PEKK), a polyethyleneimine (or PEthI), a polyetherimide (or PEI), a polyimide (or PI), a polyolefin such as a polyethylene, notably of high density, a polypropylene or a copolymer of ethylene and polypropylene, a polyamide such as a polyamide 6 (or PA-6), a polyamide 1.1 (or PA-1.1), a polyamide 12 (or PA-12), a polyamide 6.6 (or PA-6.6), a polyamide 4.6 (or PA-4.6), a polyamide 6.10 (or PA-6.10), a polyamide 6.12 (or PA-6.12) or an aromatic polyamide, in particular a polyphthalamide or an aramid, a thermoplastic polyurethane (or TPU), a polyphenylene sulphide (or PPS), a polyethylene terephthalate (or PET) or a polybutylene terephthalate (or PBT), a polysulphone such as a polysulphone in the strict meaning of the word (or PSU), a polyethersulphone (or PES) or a polyphenylsulphone (or PPSU), a polycarbonate, a polyvinyl chloride or instead a polyvinyl alcohol.

Preferably, the thermoplastic polymer is selected from polyetheretherketones and, more specifically, from polyetheretherketones conventionally used in aeronautical and space applications such as those sold by the VICTREX Company under the commercial references PEEK 90P, PEEK 150P and PEEK 450P, or those sold by the EVONIK Company under the references Vestakeep™ or instead that sold by the SOLVAY PLASTICS Company under the trade reference KetaSpire™.

Further preferably, the thermoplastic polymer is present in the impregnation bath in a micronized form, that is to say in the form of particles of which the number median diameter (D50) is at the most 50 micrometers.

The invention also relates to a method for impregnating reinforcement fibres, which comprises the immersion of the reinforcement fibres in an impregnation bath and which is characterised in that the impregnation bath is as defined previously.

In accordance with the invention, the reinforcement fibres may be selected from all fibres capable of being used as reinforcement in the manufacture of composite material parts. Thus, they may notably be glass fibres, quartz fibres, carbon fibres, graphite fibres, silica fibres, metal fibres such as steel fibres, aluminum fibres or boron fibres, ceramic fibres such as silicon carbide or boron carbide fibres, synthetic organic fibres such as aramid fibres, polyethylene fibres, polyester fibres or fibres of poly(p-phenylene benzobisoxazole), better known by the acronym PBO, natural organic fibres such as hemp fibres, linen fibres or silk fibres.

Furthermore, these fibres are, preferably, in the form of yarns grouping together several thousand elementary filaments (typically 3,000 to 48,000) measuring, for example, 6 to 10 μm diameter in the case of carbon fibres. Said fibres are known as "rovings" or "tapes".

In a preferred embodiment of the method, the reinforcement fibres are carbon fibres, in which case a weight content of reinforcement fibres ranging from 35% to 75% and, better still, from 57% to 72% with respect to the total weight of reinforcement fibres and thermoplastic polymer is used.

In another preferred embodiment of the method, the reinforcement fibres are glass or silica fibres, in which case a weight content of reinforcement fibres ranging from 45% to 82% and, better still, from 66% to 78% with respect to the total weight of reinforcement fibres and thermoplastic polymer is used.

The impregnation of the reinforcement fibres may notably be carried out—as known per se—by circulation and guiding of said fibres in a recipient of the tub or tank type, filled beforehand with the impregnation bath and with which are associated, on the one hand, an agitation system making it possible to maintain said bath homogenous and, on the other hand, drive means making it possible to ensure the circulation and the guiding of the reinforcement fibres.

The invention further relates to a method for manufacturing a prepreg having a thermoplastic matrix, which is characterised in that it comprises a step of impregnation of reinforcement fibres by a method as defined previously.

Advantageously, this method comprises, after the step of immersing the reinforcement fibres in the impregnation bath, a step of drying the reinforcement fibres, a step of heating the reinforcement fibres to a temperature above the melting temperature of the thermoplastic polymer and a step of calendering the reinforcement fibres thereby coated with thermoplastic polymer, the modalities of implementation of these steps of drying, heating and calendering being well known from the prior art and, notably, from reference [1].

The invention further relates to a method for manufacturing a part made of a composite material having a thermoplastic matrix, which is characterised in that it comprises a step of manufacturing a prepreg by a method as defined previously.

As known in the prior art, said manufacturing method may comprise in addition the production of a preform using the prepreg and the consolidation of said preform, said consolidation being preferentially carried out, in accordance with the invention, at a pressure less than or equal to 5 bars and, better still, without pressurisation.

Other characteristics and advantages of the invention will become clearer on reading the complement to the description that follows, which relates to experimental test that have made it possible to validate this invention and which is given with reference to the appended figures.

Obviously, this complement to the description is only given for the purposes of illustrating the object of the invention and does not in any case constitute a limitation of this object.

BRIEF DESCRIPTION OF THE FIGURES

FIGS. 2B and 2C correspond to two composites obtained using prepregs prepared in accordance with the invention whereas FIGS. 2D and 2E correspond to two composites obtained using prepregs serving as comparative examples.

DETAILED DESCRIPTION OF SPECIFIC EMBODIMENTS

The invention has been validated by carrying out experimental tests consisting in:

preparing a series of batches of prepregs by impregnation of rovings of carbon fibres (HexTow™ IM7 fibres—HEXCEL) in aqueous impregnation baths comprising a polyetheretherketone (PEEK 150P—VICTREX) dispersed in micronized form and a surfactant, but by changing, from one batch of prepregs to the next, the surfactant, the proportion by weight of said surfactant with respect to PEEK or the weight content of fibres;

subjecting the preforms prepared by manual draping of said prepregs to an operation of consolidation in drying oven; and assessing the material integrity (that is to say the consolidation quality) of the materials thereby obtained by an ultrasonic non-destructive test (NDT).

Figure 1:
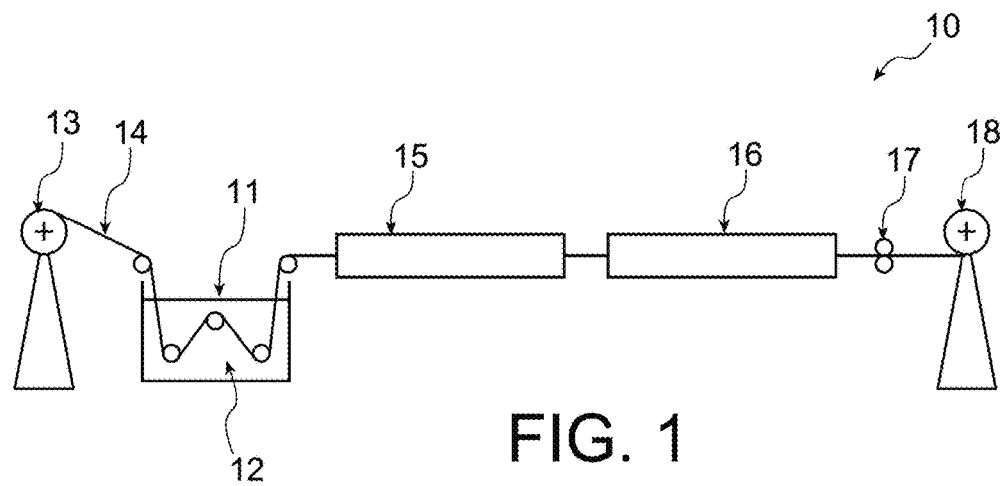
FIG. 1 is a diagram illustrating the device for continuously forming prepregs having been used to produce prepregs within the framework of experimental tests aiming to validate the invention.

Preparation of the Batches of Prepregs:

5 batches of prepregs are prepared, designated L1 to L5, using the device 10 illustrated schematically in FIG. 1, which makes it possible to continuously form prepregs, in the form of calibrated tapes, using rovings of reinforcement fibres.

As may be seen in this figure, said device (which is known per se) comprises:

a tank 11 filled with an impregnation bath 12;

a spool 13 which is situated upstream (in the direction of circulation of the rovings of reinforcement fibres in the device 10) of the tank 11 and on which are wound the rovings of reinforcement fibres 14 before their introduction in the impregnation bath;

an infrared oven 15 which is situated downstream of the tank 11 and which makes it possible to dry the rovings of reinforcement fibres when they come out of the impregnation bath;

a series of hot air ovens 16 situated downstream of the oven 15 and which make it possible to melt the polymer impregnating the rovings of reinforcement fibres and to consolidate said rovings;

a calendering device 17 which is situated downstream of the series of ovens 16 and which makes it possible to give to the rovings of reinforcement fibres the desired shape and dimensions;

a spool 18 which is situated downstream of the calendering device 17 and on which are wound the rovings of reinforcement fibres when they come out of said calendering device; and a synchronous drive system (not represented in FIG. 1) ensuring the circulation of the rovings of reinforcement fibres from the spool 13 to the spool 17.

The composition of the impregnation baths and the contents by weight of fibres having been used for batches L1 to L5 are specified hereafter.

L1: According to the Teaching of Reference [1]
PEEK 150P: 1 kg
Water: 2 kg per kg of polymer
Surfactant: cetearyl alcohol 25 times ethoxylated (Cremophor™ A 25—BASF)—1.5% (w/w) of the polymer
Weight content of fibres: 59%

L2:
PEEK 150P: 1 kg
Water: 2 kg per kg of polymer
Surfactant: stearyl alcohol 100 times ethoxylated (Brij™ S100—CRODA)—1.0% (w/w) of the polymer
Weight content of fibres: 62%

L3:
Impregnation bath of composition identical to that used for batch L2
Weight content of fibres: 59%

L4:
PEEK 150P: 1 kg
Water: 2 kg per kg of polymer

Surfactant: stearyl alcohol 20 times ethoxylated (Brij™ S20—CRODA)—1.5% (w/w) of the polymer Weight content of fibres: 59%

L5:

PEEK 150P: 1 kg

Water: 2 kg per kg of polymer

Surfactant: polyoxoethylene sorbitan monolaurate (Polysorbate 20—SIGMA-ALDRICH)—2.0% (w/w) of the polymer Weight content of fibres: 62%

The impregnation baths are maintained under agitation throughout the duration of the impregnation (2 hours).

The prepregs of batch L1 (which correspond to prepregs of the prior art and serve as reference) measure around 0.13 mm×6.35 mm of traversal section whereas the prepregs of batches L2 to L5 measure around 0.15 mm×50 mm of traversal section.

Preparation of the Preforms and Consolidation in Drying Oven:

Preforms of 4 folds, measuring 200 mm by 200 mm, are prepared by manual draping, by forming linking points between the fibres using a soldering iron (soldering tip temperature: 450° C.) using batches L1 to L5 of prepregs. The draping is carried out with a mirror symmetry according to a sequence 90°/0°/0°/90°.

Said preforms are consolidated in a drying oven, under bladder (pressure: 850 mbars), by applying the following consolidation cycle:

creation of a vacuum in the drying oven;

increase in temperature from 20° C. to 300° C. at a rate of 2° C./minute;

degassing plateau at 300° C. for 20 minutes;

increase in temperature from 300° C. to 395° C. at a rate of 2° C./minute;

consolidation plateau at 395° C. for 25 minutes; and decrease in temperature down to 20° C. at a rate of 2° C./minute.

Assessment of the Consolidation of the Composites by NDT:

The consolidation quality of the materials obtained above is assessed by an ultrasonic non-destructive test by immersion according to the double transmission method. This type of testing, which is well known per se, makes it possible to establish a mapping of the defects and, notably, of the residual porosity that a material exhibits after its manufacture without harming the integrity of the structure of said material.

Figures 2A, 2B, 2C:
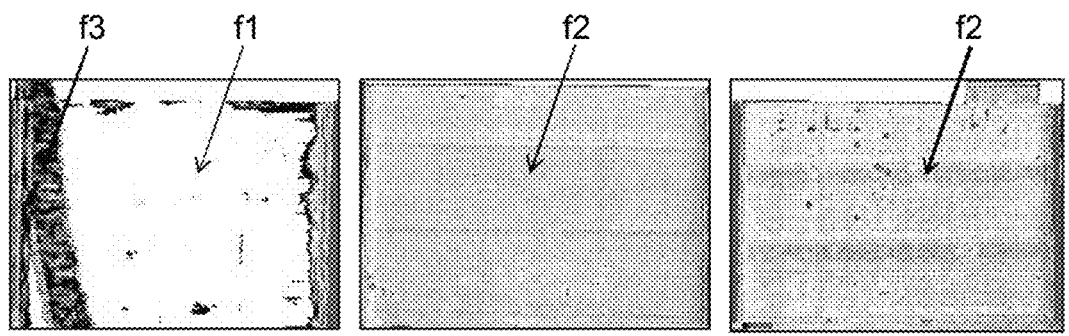
FIGS. 2A to 2E illustrate the mappings obtained by ultrasonic non-destructive testing of composites, all prepared in the same experimental conditions but using prepregs having been, for their part, prepared by impregnation in different impregnation baths; thus, FIG. 2A corresponds to a composite obtained using a prepreg prepared in accordance with the prior art.

Results:

The results are illustrated in FIGS. 2A to 2E which show the ultrasound mappings obtained for the different composites: FIG. 2A corresponds to a composite prepared using a prepreg of batch L1; FIGS. 2B and 2C correspond to two composites respectively prepared using the prepregs of batches L2 and L3, whereas FIGS. 2D and 2E correspond to two composites respectively prepared using the prepregs of batches L4 and L5.

In these mappings, which are originally in colour but which are presented in the appendix in grey scales, the lightest grey tone, referenced f1, corresponds to an absence of propagation of the ultrasonic wave in the composite, which is the sign of poor consolidation of the composite. The darkest grey tone, referenced f3, corresponds to an attenuation of the ultrasonic wave of the order of 90% and to the presence of porosities in the composite, which is also the sign of poor consolidation of the composite. On the other hand, the intermediate grey tone, referenced f2, corresponds to an attenuation situated between 20% and 30% of the ultrasonic wave in the composite and reflects, for its part, good consolidation of the composite.

It should be noted that the grey tone f2 correspond typically to materials of which the residual porosity is less than 1%, that is to say to materials meeting aeronautical and space requirements.

As FIG. 2A shows, the consolidation of the composite prepared using the prepreg of batch L1 serving as reference is of very poor quality since the mapping obtained for this composite is mainly occupied by a zone with grey tone f1 (absence of propagation of the ultrasonic wave).

Figures 2D, 2E:
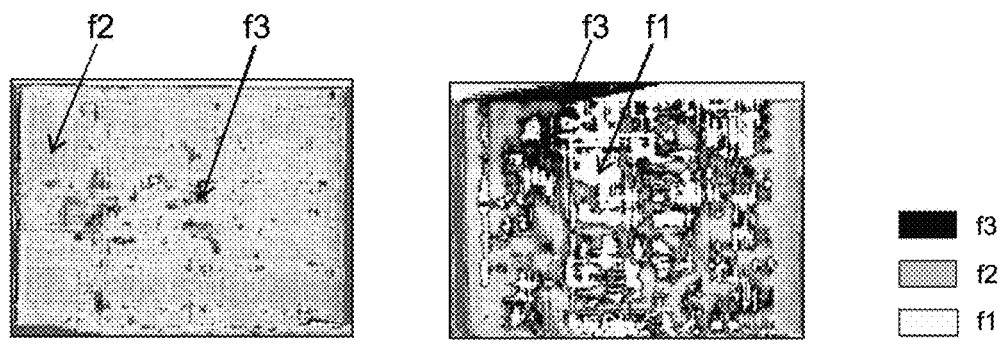

The consolidation of the composite prepared using the prepreg of batch L5 (batch of the impregnation bath comprising polyoxoethylene sorbitan monolaurate as surfactant) is also of very poor quality since the mapping obtained is essentially constituted of a juxtaposition of zones with grey tones f1 and f3 (FIG. 2E).

The consolidation of the composite prepared using the prepreg of batch L4 (batch of the impregnation bath comprising stearyl alcohol 20 times ethoxylated as surfactant) is of better quality than that of the preceding composites but irregular zones remain (FIG. 2D).

On the other hand, the consolidation of the composites prepared using the prepregs of batches L2 and L3, in accordance with the invention, is, for its part, very satisfactory (FIGS. 2B and 2C).

These results confirm that the use of a stearyl alcohol 100 times ethoxylated, as surfactant in an aqueous impregnation bath for reinforcement fibres, makes it possible to obtain prepregs having a thermoplastic matrix which results in highly satisfactory consolidation of the composite materials obtained using said prepregs, without external pressurisation (the external pressure being simply atmospheric pressure), which is not the case either with the use of cetearyl alcohol 25 times ethoxylated used in the prior art nor even with that of a stearyl alcohol 20 times ethoxylated instead of 100.

REFERENCE CITED

[1] U.S. Pat. No. 5,888,580

What is claimed is:

1. An impregnation bath for reinforcement fibres for a manufacture of a prepreg having a thermoplastic matrix, comprising at least one thermoplastic polymer, a surfactant and water, wherein the surfactant is an ethoxylated stearyl alcohol of formula: $HO-(CH_2-CH_2-O)_n-CH_2-(CH_2)_{16}-CH_3$ wherein n is 100.

2. The impregnation bath of claim 1, which comprises from 0.25% to 5% by weight of the surfactant with respect to the thermoplastic polymer.

3. The impregnation bath of claim 1, which comprises from 10% to 50% by weight of the thermoplastic polymer with respect to water.

4. The impregnation bath of claim 1, wherein the thermoplastic polymer is a polyaryletherketone, a polyethyleneimine, a polyolefin, a polyamide, a polyimide, a thermoplastic polyurethane, a polyphenylene sulphide, a polyethylene terephthalate, a polybutylene terephthalate, a polysulphone, a polycarbonate, a polyvinyl chloride or a polyvinyl alcohol.

5. The impregnation bath of claim 4, wherein the thermoplastic polymer is a polyetheretherketone.

6. The impregnation bath of claim 1, wherein the thermoplastic polymer is in a micronized form.

7. A method for impregnating reinforcement fibres for a manufacture of a prepreg having a thermoplastic matrix, comprising an immersion of the reinforcement fibres in an impregnation bath comprising at least one thermoplastic polymer, a surfactant and water, wherein the surfactant is an ethoxylated stearyl alcohol of formula: $HO-(CH_2-CH_2-O)_n-CH_2-(CH_2)_{16}-CH_3$ wherein n is 100.

8. The method of claim 7, wherein the reinforcement fibres are glass fibres, carbon fibres, graphite fibres, silica fibres, metal fibres, ceramic fibres, synthetic organic fibres or natural organic fibres.

9. The method of claim 7, wherein the reinforcement fibres are carbon fibres and the impregnation bath comprises from 35% to 75% by weight of immersed reinforcement fibres with respect to the total weight of the reinforcement fibres and the thermoplastic polymer.

10. The method of claim 7, wherein the reinforcement fibres are glass or silica fibres and the impregnation bath comprises from 45% to 82% by weight of immersed reinforcement fibres with respect to the total weight of the reinforcement fibres and the thermoplastic polymer.

11. A method for manufacturing a prepreg having a thermoplastic matrix, comprising a step of impregnating reinforcement fibres, the impregnating step comprising an immersion of the reinforcement fibres in an impregnation bath comprising at least one thermoplastic polymer, a surfactant and water, wherein the surfactant is an ethoxylated stearyl alcohol of formula: $HO-(CH_2-CH_2-O)_n-CH_2-(CH_2)_{16}-CH_3$ wherein n is 100.

12. A method for manufacturing a part made of a composite material having a thermoplastic matrix, comprising a step of impregnating reinforcement fibres, the impregnating step comprising an immersion of the reinforcement fibres in an impregnation bath comprising at least one thermoplastic polymer, a surfactant and water, wherein the surfactant is an ethoxylated stearyl alcohol of formula: $HO-(CH_2-CH_2-O)_n-CH_2-(CH_2)_{16}-CH_3$ wherein n is 100.

13. The method of claim 11, further comprising:
a step of drying the impregnated reinforcement fibres,
a step of heating the dried reinforcement fibres to a temperature above the melting temperature of the thermoplastic polymer, and
a step of calendering the heated reinforcement fibres.

* * * * *